United States Patent [19]

Wells et al.

[11] Patent Number: 4,655,191

[45] Date of Patent: Apr. 7, 1987

[54] WIRE SAW MACHINE

[75] Inventors: Raymond C. Wells, Scottsdale; Thomas J. Hatfield, Tempe, both of Ariz.

[73] Assignee: Motorola, Inc., Schaumburg, Ill.

[21] Appl. No.: 709,758

[22] Filed: Mar. 8, 1985

[51] Int. Cl.⁴ .............................................. B28D 1/06
[52] U.S. Cl. ................................... 125/16 R; 125/21; 242/156.2; 83/751; 83/784
[58] Field of Search ...................... 242/156, 553, 156.2, 242/118.41; 226/195; 125/21, 16 R, 16 L, 12; 83/751, 784, 433

[56] References Cited

U.S. PATENT DOCUMENTS

| | | | |
|---|---|---|---|
| 2,911,875 | 11/1959 | Ostermann | 242/156 |
| 3,008,864 | 11/1961 | Macklem | 83/433 |
| 3,027,285 | 3/1962 | Eisner | 242/156.2 |
| 3,155,087 | 11/1964 | Dreyfus | 125/21 |
| 3,359,848 | 12/1967 | Ostermann | 242/156 |
| 3,540,427 | 11/1970 | Anderson | 125/21 |
| 3,630,114 | 12/1971 | Bunting | 83/433 |
| 3,942,508 | 3/1976 | Shimizu | 125/21 |
| 4,044,509 | 8/1977 | Bos | 125/21 |
| 4,191,159 | 3/1980 | Collins | 125/21 |

Primary Examiner—Harold D. Whitehead
Attorney, Agent, or Firm—Joe E. Barbee

[57] ABSTRACT .

A wire saw machine having a wire supply source providing a plurality of strands of wire results in a wire saw system having parallel wires. The wire supply source feed spindle holds a supply source at a slight angle advance to allow the wire to transfer from the supply source to a grooved wire guide in a parallel manner. Two moveable wire guides are used to impart a back and forth motion to the wire over the cutting area and at the same time serve as an intermediate storage area for the wire being used in the cutting area. The wire supply source includes a plurality of individually rotatable wire reels. A friction disc is located between each of the individual wire reels and is held fixed with respect to the spindle.

14 Claims, 4 Drawing Figures

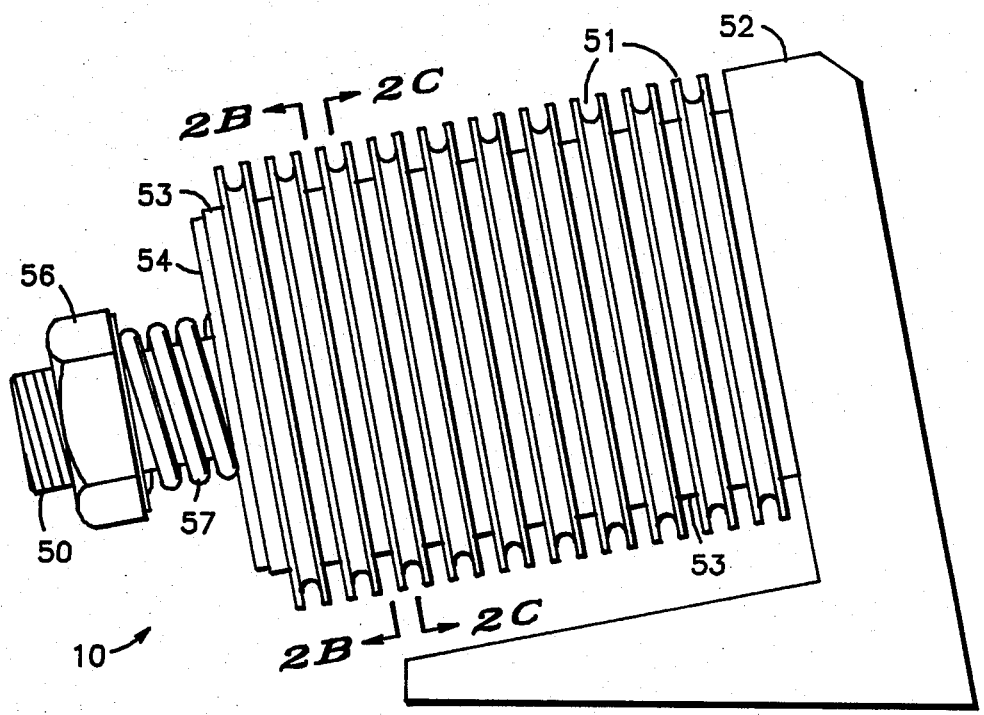
*FIG. 2A*
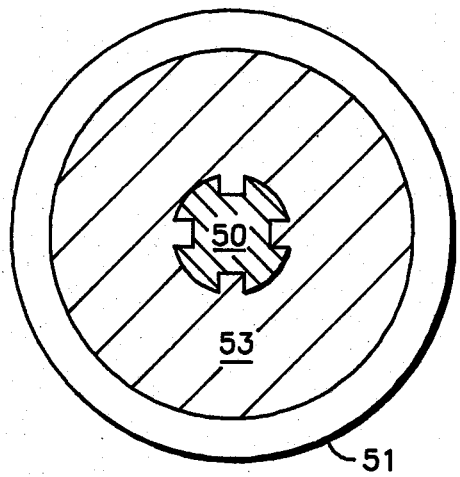  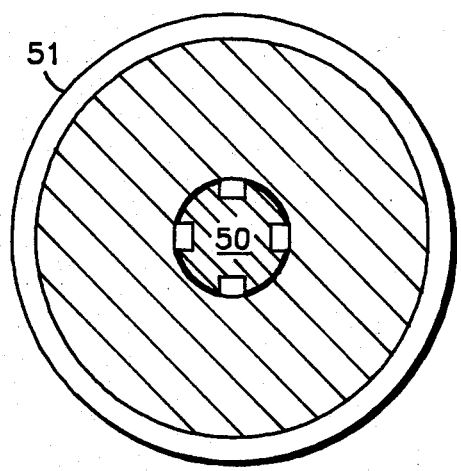
*FIG. 2B*   *FIG. 2C*

WIRE SAW MACHINE

BACKGROUND OF THE INVENTION

This invention relates, in general, to wire saw machines, and more particularly, to a wire saw machine for cutting brittle materials wherein the wire saw machine has a supply source that supplies a plurality of strands of wire.

Wire saw machines have been in use for some time. However, these prior machines had a feed or supply reel which supplied a single strand of wire. This single strand of wire was then wrappped around a plurality of wire guides which were arranged in a group of three or four wire guides. The wire guides had a multiplicity of grooves to accept the wrapped wire. The wire was wrapped in a spiral configuration which caused a "pitch lead" misalignment on the wire guides. The wrapped wire thus was formed into a plurality of strands of wire and provided a web in a cutting or sawing area. Since the material to be cut or sawed by the wires was moved through the wires forming the web, the cut material usually ended up with a bow or warp in it caused by the pitch and twist in the wires. Another disadvantage with the single wire loop supply system was that if the wire were to break during a sawing operation an additional flaw resulted in the material being sawed, particularly if the brittle material was thick.

Accordingly, it is an object of the present invention to provice a new and improved wire saw machine.

Another object of the present invention is to provide a wire saw machine wherein the cutting wires are parallel to each other and not pitched.

A further object of the present invention is to provide a wire saw machine having a wire supply source capable of providing a plurality of strands of wire.

Another further object of the present invention is to provide a wire saw machine having a single means for providing the back and forth motion of the wire across the cutting area and at the same time temporarily storing the wire used in the cutting action.

Yet another object of the present invention is to provide a wire supply source that supplies a plurality of strands of wire each under individual tension control.

Yet a further additional object of the present invention is to provide a wire saw machine having a reduced number of moving parts thereby improving reliability and reducing maintenance.

SUMMARY OF THE INVENTION

The above and other objects and advantages of the present invention are achieved by providing a wire supply source capable of supplying a plurality of wires each under individual tension control. This results in a wire saw machine having parallel wires. The wire saw machine further includes means for providing back and forth motion to the wire at the wire sawing area and at the same time providing intermediate storage for the wire that is used to provide the sawing action.

The subject matter which is regarded as the present invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 2A illustrates the wire supply source of the wire saw machine illustrated in FIG. 1;

FIG. 2B illustrates a cross section of the wire supply source of FIG. 2A taken along the lines B—B; and FIG. 2C illustrates a cross section of the wire supply source of FIG. 2A taken along the lines C—C.

Figure 1:
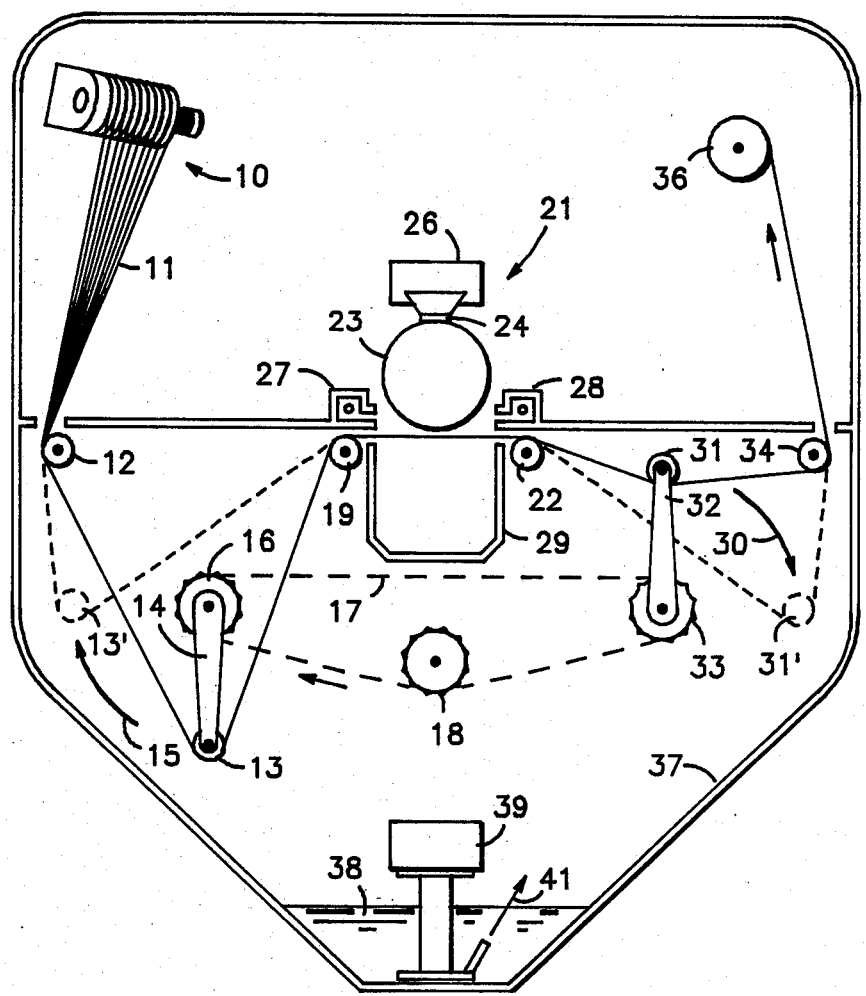
FIG. 1 illustrates in schematic form an embodiment of the present invention.

The exemplification set out herein illustrates the preferred embodiment of the invention in one form thereof, and such exemplification is not to be construed as limiting in any manner.

DETAILED DESCRIPTION OF THE DRAWINGS

Illustrated in FIG. 1 is a wire saw machine having wires which are aligned parallel substantially throughout the entire system. A wire supply source or wire supply means 10 provides a plurality of strands of wire 11 which engage a fixed wire guide 12, a moveable wire guide 13, a fixed wire guide 19, a fixed wire guide 22, a moveable wire guide 31, a fixed wire guide 34, and a take-up means 36. The wire guides all have multiple grooves so that each groove accepts one of the plurality of strands of wire 11 and to maintain the plurality of wires in a fixed and parallel configuration. It should be noted that wire guides 12, 19, 22, and 34 are capable of rotating but are fixed with respect to each other. In other words, these rollers or wire guides maintain a fixed spaced relationship, whereas wire guides 13 and 31 are capable of not only rotating but also of moving as indicated by 13' and 31' (shown in phantom) and arrows 15 and 30.

Wire guides 19 and 22 maintain a spaced apart relationship and form a cutting area therebetween. A brittle material 23, such as a semiconductor crystal or the like is shown attached to a moveable mechanism 26 which is capable of moving brittle material 23 across the strand of wires between wire guides 19 and 22. Spacer 24 serves as an interface between mechanism 26 and brittle material 23. In a semiconductor environment, spacer 24 is usually plastic or glass and is bonded to semiconductor material 23 and to mechanism 26. As mechanism 26 pushes semiconductor material 23 through the multiple strand of wires and cutting area 21, the semiconductor material is sawed into a plurality of wafers.

The sawing action is provided by moving the plurality of strands of wire back and forth in an abrasive slurry in cutting area 21. This back and forth action is provided by a means having a drive gear 18, drive belt or chain 17, and toothed wheels 16 and 33. Wheel or gear 16 is attached to an arm 14 upon which wire guide 13 is mounted. As wheel 16 rotates arm 14 swings in a path to cause wire guide 13 to move in a circular pattern as illustrated by arrow 15. Wire guide 13' illustrates one instantaneous position of wire guide 13 during the circular motion. At the same time as wheel 16 is driving wire guide 13 in a circular path, wheel 33 is causing arm 32 to drive wire guide 31 in a circular path as illustrated by arrow 30. The drive mechanism drives wire guides 13 and 31 in a synchronous and opposite direction. Note that when wire guide 13 is at its lowest position wire guide 31 is at its highest, and when wire guide 13 is at its left-most position as illustrated by wire guide 13', wire guide 31 is at its right-most position as illustrated by wire guide 31'. Wire guides 13 and 31 could be mounted on a long rocker arm which would move guides 13 and 31 in an opposite up and down motion. However, in a preferred embodiment, wire guides 13 and 31 are moved in a circular configuration. Also, wheels 16 and 33 could be enlarged so that wire guides 13 and 31 could be mounted near their periphery, respectively, thereby replacing arms 14 and 32.

Wire supply source 10 holds the plurality of strands of wires in tension so that the motion of wire guides 13 and 31 will not cause additional wire to be fed from source 10. Therefore, as wire guide 13 moves towards the wire guide 13' position less wire is available between wire guides 12 and 19. Simultaneously, wire guide 31 is moving towards the wire guide 31' position thereby increasing the amount of wire between wire guides 22 and 34. This creates a back and forth motion of the plurality of strands of wire in cutting area 21 thereby resulting in the wire sawing or cutting action. Take-up means 36 is, in a preferred embodiment, a spool having a plurality of very deep grooves for accepting wire. As the wire in cutting area 21 performs its cutting function, it has a tendency of wearing thin. Take-up means 36 will pull new wire from source 10 at a rate which prevents the wire from wearing thin enough to break. Take-up means 36 can be driven by a variable speed motor preferably with a gear box to gear it down. The variable speed motor will supply sufficient torque to pull new wire off of source 10.

The cutting or sawing action is done in an abrasive slurry supplied to the strands of wires in cutting area 21 by slurry supply orifices 27 and 28. Shield or basket 29 surrounds brittle material 23 to catch the material being cut and strain large particles from the abrasive slurry. Shield 29 contains a plurality of perforations to allow the slurry to return to slurry tank or reservoir 37. Slurry tank 37 collects the slurry 38 and uses pump 39 to pump the slurry back up to orifices 27 and 28 as illustrated by arrow 41 which symbolizes a slurry line not shown in its entirety.

Prior wire saw machines typically had an intermediate storage system which was located away from the cutting area. This intermediate storage system was used to store and supply the wire during the back and forth motion across the cutting area. In such a system the slurry had to be stripped from the wire before it reached the intermediate storage area. Compressed air was usually used to strip the slurry. The stripped slurry was wasted and at the same time this procedure used a large quantity of compressed air. The compressed air tended to create a high noise environment. These problems, with the prior wire saw machines, are eliminated since in the present invention there is no need to strip the slurry from the wire because the intermediate storage area is adjacent to the cutting area and the travel of the take-up reel is not great enough to cause rapid wear out.

FIG. 2A illustrates in greater detail wire supply source 10. Source 10 has a spindle 50 held by a bracket 52. Spindle 50 can be splined or grooved as will be discussed in greater detail hereinafter. A plurality of reels or wire holders 51 are mounted on spindle 50. A friction disc 53 is located between each reel 51 as well as at each end of the series of reels 51. Reels 51 are axially loaded through compression means 57 which pushes against washer 54. Compression means 57 is illustrated as a spring but can be any suitable means to provide the axial loading of reels 51. The amount of loading or friction holding reels 51 can be increased by tightening nut 56 thereby compressing spring 57. In a preferred embodiment, the friction provided by friction pads 53 will provide a substantially identical static and dynamic friction. Supply reels 51 have the same axial load but are capable of exerting the desired tension to the wire independently from each other. The rotation of one reel does not cause an adjacent reel to rotate.

Note that bracket 52 holds spindle 50 at an angle. The angle is provided so that the plurality of strands of wire 11 can be spaced closer together by the time they reach the first wire guide 12 shown in FIG. 1. The tangent of the angle at which spindle 50 is held is equal to the width of the wire guide grooves divided by the combined width of reel 51 plus the thickness of friction disc 53. In other words, since the grooves in the wire guides only accommodate one strand of wire and the grooves are close to each other, compensation must be provided to allow the wire coming off the spools of wire from source 10 to be parallel with the wire guide grooves of wire guide 12. Therefore, the tangent of the angle is the distance separating the wire on the wire guides divided by the distance separating the wires on reels 51. This allows spools or reels 51 to be wider thereby holding a reasonable supply of wire.

FIG. 2B is a cross section of a disc 51 taken along the lines B—B of FIG. 2A. FIG. 2B illustrates the splines or grooves in spindle 50 and how they mate with the notches in friction disc 53 so that friction disc 53 is held in a manner to prevent it from rotating on spindle 50. An alternate method of providing a friction force to reels 51 would be to have a fixed sheet or plate between each reel 51 and a friction pad on each side of the fixed plate. In such a case the friction pads could be free to rotate on the spindle.

FIG. 2C is a cross-sectional view of a wire supply reel 51 taken along the lines C—C of FIG. 2A. Note that the hub of reel 51 does not have notches to mate with the grooves in spindle 50. This allows reels 51 to rotate on spindle 50.

By now it should be appreciated that there has been provided a new and improved wire saw machine having a reduced number of moving parts and eliminating the feedback control systems for wire tension, the take-up reel and drive motor reversals. This results in greater reliability and lower maintenance costs. The wires have a parallel alignment thereby eliminating the pitch misalignment in the cutting area which resulted in wire twist causing bowed and warped semiconductor wafers when the wire saw was used to slice a semiconductor crystal into wafers. In the present parallel wire system a break in a wire would only result in damage to two wafers whereas in the previous wire saw all the wafers out of a single semiconductor crystal would be damaged.

Those persons skilled in the art will recognize that it may be necessary to provide some compensation for inherent spring within the wire loop caused by mismatch of the means providing the movement and intermediate wire storage. This compensation can be provided in various manners such as by having wire guide 12 held in a spring loaded fashion so that it can provide some slack to the multi-strand wire loop.

We claim:

1. A wire saw machine for cutting brittle materials into a plurality of thin slices, comprising:
single spindle means for supplying a plurality of strands of wire;
a pair of wire guides each having a plurality of grooves for receiving the plurality of strands of wire and arranged to form a cutting area between the pair of wire guides;

means for imparting back and forth motion to the plurality of strands of wires by engaging the plurality of strands of wires on each side of the pair of wire guides; and means for taking up used wire.

2. The wire saw machine of claim 1 wherein the means for imparting back and forth motion includes two wire guides, one located on each side of the pair of wire guides, the two wire guides being synchronously driven so that they alternately take-up or provide wire across the pair of wire guides while maintaining the strands of wire under tension.

3. The wire saw machine of claim 1 wherein the single spindle means for supplying a plurality of strands of wire comprises a plurality of reels each for providing one continuous strand of wire, the plurality or reels being located on the spindle; and a friction pad located between each of the plurality of reels.

4. The wire saw machine of claim 3 wherein the plurality of reels are free to rotate on the spindle and the friction pads are non-rotatable.

5. The wire saw machine of claim 1 further comprising only two drive means, a first drive means being for synchronously driving the means for imparting back and forth motion, and a second drive means for driving the means for taking up used wire.

6. A method of sawing a brittle material comprising: providing a plurality of reels rotatably mounted on a single spindle and each being individually impeded thereby providing a plurality of strands of tensioned wire; passing the plurality of strands of wire over spaced apart wire guides to provide a sawing area between the spaced apart wire guides; engaging the plurality of strands of wire with a first moveable wire guide on one side of the spaced apart wire guides; engaging the plurality of strands of wire with a second moveable wire guide on the other side of the spaced apart wire guides; moving the first and second moveable wire guides synchronously in opposite directions to provide back and forth motion of the strands of wire between the spaced apart wire guides; and taking up used wire on a take-up reel capable of accepting the plurality of strands of wire.

7. A wire saw machine for sawing brittle material comprising: a source for supplying a plurality of strands of wire; two spaced apart wire guides for guiding the plurality of strands of wire and for providing a fixed relationship between the strands of wire to provide a sawing area between the two spaced apart wire guides; take-up means for taking up used strands of wire after the wire has been used in the sawing area; a first moveable wire guide for engaging the plurality of strands of wire prior to reaching the two spaced apart wire guides; and a second moveable wire guide for engaging the plurality of strands of wire between the two spaced apart wire guides and the take-up means, the first and second moveable wire guides being mounted for simultaneous movement in opposite directions to impart back and forth motion to the plurality of strands of wire in the sawing area and to provide intermediate storage for the wire being moved back and forth.

8. The wire saw machine of claim 7 wherein the source for supplying a plurality of strands of wire exerts a frictional restraining force on each individual strand of wire which withstands the force exerted by the movement of the first and second moveable wire guides and yields to the force exerted by the take-up means.

9. The wire machine of claim 8 further including a first drive means for providing the simultaneous movement to the first and second moveable wire guides; and a second drive means for driving the take-up means.

10. A source for supplying a plurality of strands of wire comprising: a spindle; a plurality of reels positioned on the spindle for supplying the plurality of strands of wire; and friction means positioned between each of the reels to impede the reels from rotating freely, wherein the spindle is splined, and the friction means are discs having a hub to mate the splined spindle thereby maintaining the discs in fixed relationship with respect to the spindle.

11. A wire saw machine for sawing brittle material, the improvement comprising a source for supplying a plurality of strands of tensioned wire wherein the wire supplied to a sawing area is all new wire and wherein the source comprises a spindle having a plurality of wire carrying reels and a friction disc located between each reel to help provide the tension.

12. A wire saw machine for sawing brittle material, the improvement comprising a source for supplying a plurality of strands of tensioned wire wherein the source comprises a spindle having a plurality of wire carrying reels and a friction disc located between each reel to help provide the tension, and wherein the spindle is grooved, the reels are rotatably mounted on the spindle, and the discs have a central opening to mate with the grooved spindle so that the discs are fixed with respect to the spindle.

13. A wire saw machine for sawing brittle material comprising: means for supplying a plurality of strands of wire; means for providing back and forth movement to the plurality of strands of wire and for simultaneously providing intermediate storage of the wire undergoing the back and forth motion; and take-up means for taking up the plurality of strands of wire after it has been used for sawing.

14. The wire saw machine of claim 13 wherein the means for supplying includes a spindle having a plurality of reels which are held in compression on the spindle, and a friction pad between each reel.

* * * * *